US011608617B2

(12) United States Patent
Pacior

(10) Patent No.: US 11,608,617 B2
(45) Date of Patent: Mar. 21, 2023

(54) RAINWATER COLLECTION ASSEMBLY

(71) Applicant: Casimir Pacior, Oil City, PA (US)

(72) Inventor: Casimir Pacior, Oil City, PA (US)

( * ) Notice: Subject to any disclaimer, the term of this patent is extended or adjusted under 35 U.S.C. 154(b) by 282 days.

(21) Appl. No.: 17/139,604

(22) Filed: Dec. 31, 2020

(65) Prior Publication Data

US 2022/0205226 A1 Jun. 30, 2022

(51) Int. Cl.
*E03B 3/03* (2006.01)
*E04D 13/08* (2006.01)

(52) U.S. Cl.
CPC ............... *E03B 3/03* (2013.01); *E04D 13/08* (2013.01); *E04D 2013/0873* (2013.01); *Y10T 137/698* (2015.04); *Y10T 137/6969* (2015.04)

(58) Field of Classification Search
CPC .. E03B 3/03; Y10T 137/6969; Y10T 137/698; E04D 2013/0873
USPC .................................................. 220/476, 480
See application file for complete search history.

(56) References Cited

U.S. PATENT DOCUMENTS

| | | | | |
|---|---|---|---|---|
| 5,482,084 A | * | 1/1996 | Cassidy | E04D 13/08 137/120 |
| 5,964,246 A | * | 10/1999 | Meeker | E03C 1/042 137/382 |
| 6,663,769 B2 | | 12/2003 | Hosoya | |
| 7,025,879 B1 | * | 4/2006 | Ticknor | E03B 3/03 210/474 |
| 7,493,728 B2 | | 2/2009 | Dussault | |
| 8,689,819 B2 | | 4/2014 | Hashimoto | |
| 9,890,520 B2 | * | 2/2018 | Brucker | E03B 3/03 |
| 2010/0320203 A1 | * | 12/2010 | Moodie | E03B 3/03 220/9.3 |
| 2011/0226350 A1 | * | 9/2011 | Russell | E04D 13/08 137/561 A |
| 2014/0034152 A1 | * | 2/2014 | Drummond | E04H 17/1404 137/363 |

FOREIGN PATENT DOCUMENTS

WO  WO2012151557  11/2012

* cited by examiner

*Primary Examiner* — Kevin F Murphy

(57) ABSTRACT

A rainwater collection assembly for collecting rainwater includes a reservoir that is mountable to a wall of a building and the reservoir has an inlet that is in fluid communication with a downspout of a gutter system of the building to direct rainwater into the reservoir for storage. The reservoir has a pair of outlets each being integrated therein to release the rainwater from the reservoir. A spigot is fluidly integrated into the reservoir to release the rainwater from the reservoir when the spigot is opened. An intake pipe is fluidly coupled to the inlet in the reservoir and the intake pipe can be fluidly coupled to a downspout of the gutter system for directing the rainwater into the reservoir.

12 Claims, 5 Drawing Sheets

RAINWATER COLLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to collection devices and more particularly pertains to a new collection device for collecting rainwater. The device includes an inlet pipe that is coupled to a gutter system and a spigot for releasing the rainwater. Additionally, the device includes a reservoir that is mounted to an exterior wall of a building.

(2) Description of Related Art Including Information Disclosed Under 37 CFR 1.97 and 1.98

The prior art relates to collection devices including a diversion pipe that is fluidly coupled to a downspout of a gutter system and which includes a spigot. The prior art discloses a rainwater collection system which includes a remote storage pond. The prior art discloses a novel rain gutter system that includes an intake pipe and a gutter that is structurally integrated into the roof of a building.

BRIEF SUMMARY OF THE INVENTION

An embodiment of the disclosure meets the needs presented above by generally comprising a reservoir that is mountable to a wall of a building and the reservoir has an inlet that is in fluid communication with a downspout of a gutter system of the building to direct rainwater into the reservoir for storage. The reservoir has a pair of outlets each being integrated therein to release the rainwater from the reservoir. A spigot is fluidly integrated into the reservoir to release the rainwater from the reservoir when the spigot is opened. An intake pipe is fluidly coupled to the inlet in the reservoir and the intake pipe can be fluidly coupled to a downspout of the gutter system for directing the rainwater into the reservoir.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
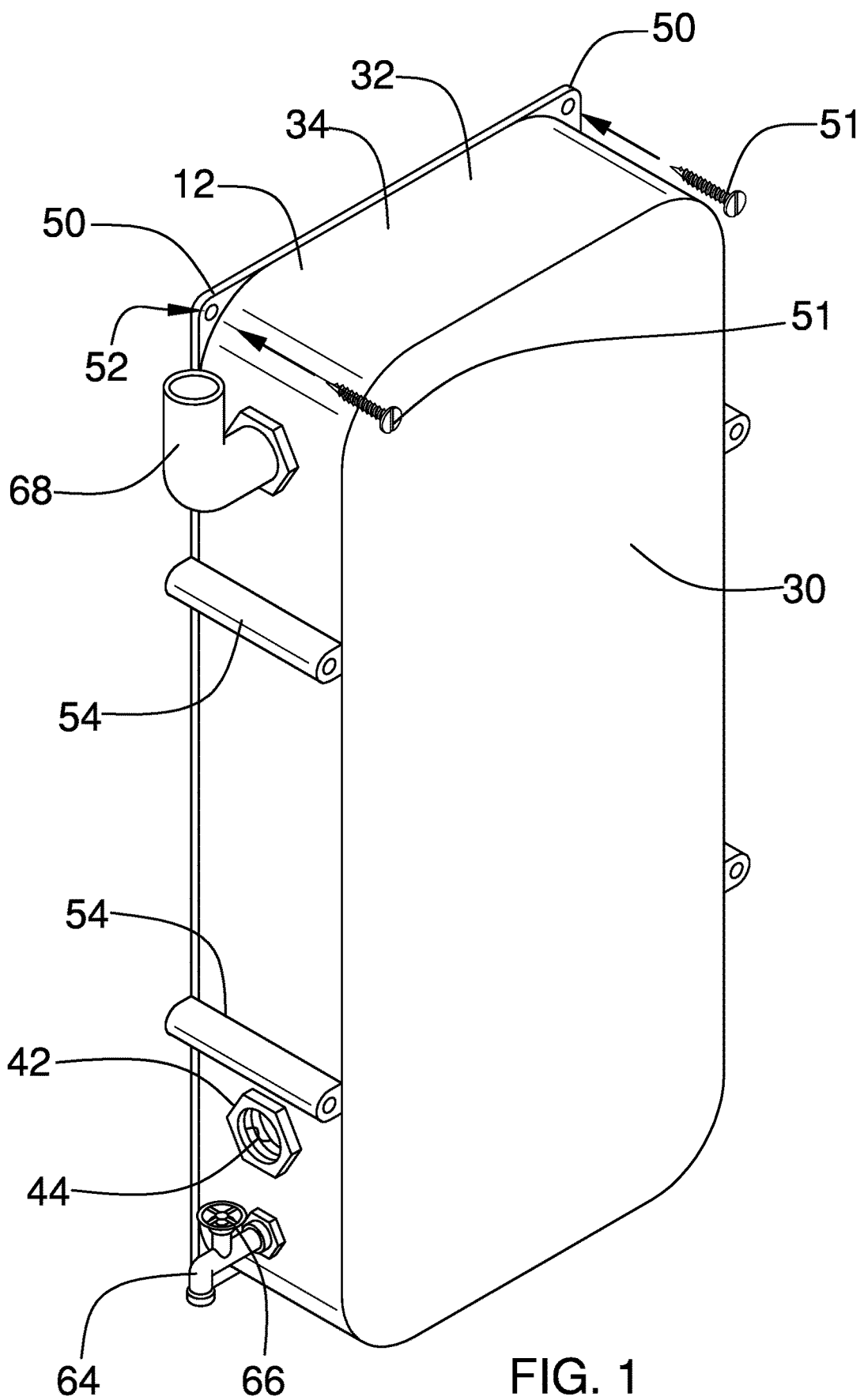
FIG. 1 is a back perspective view of a rainwater collection assembly according to an embodiment of the disclosure.
Figure 2:
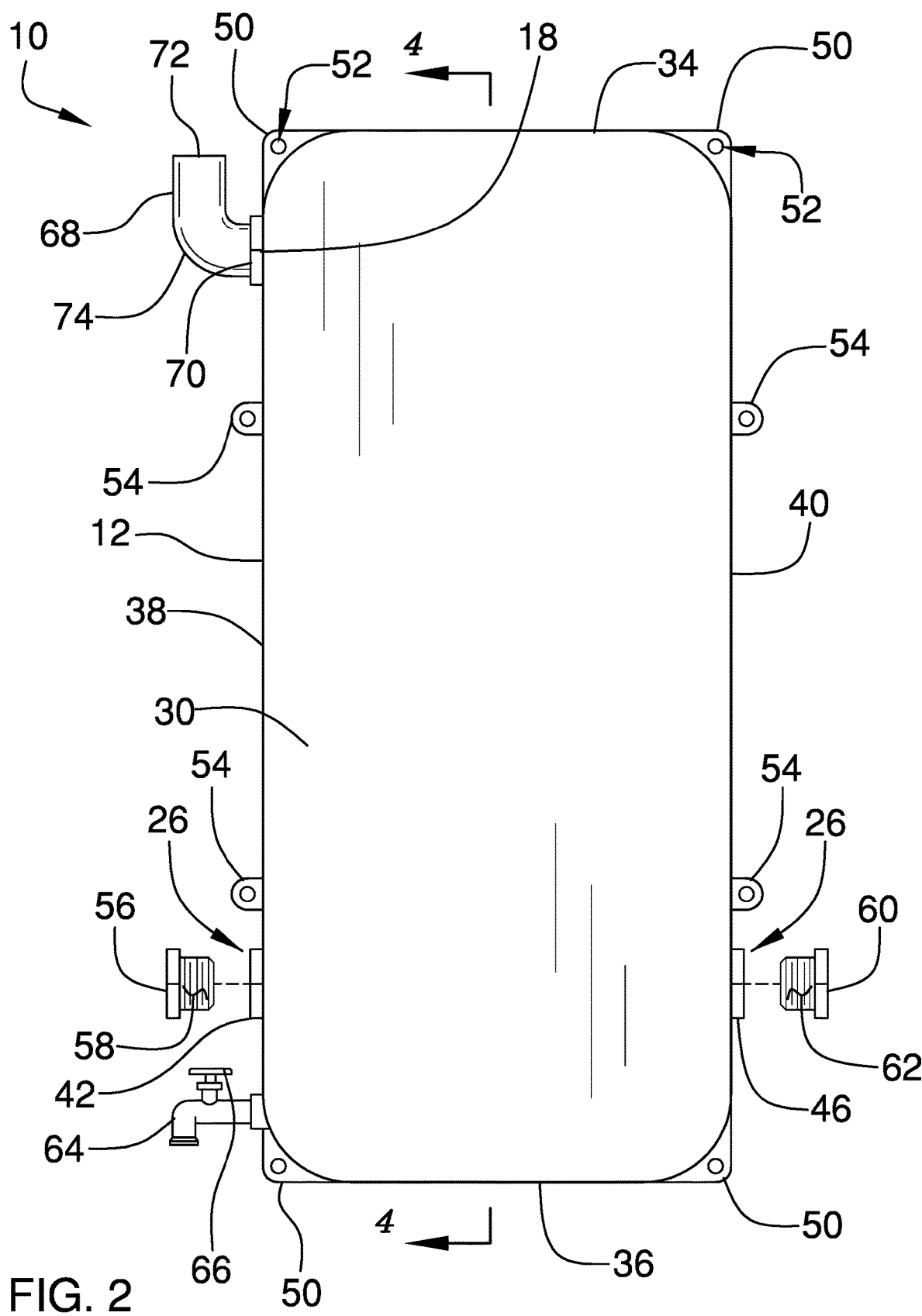
FIG. 2 is a back view of an embodiment of the disclosure.
Figure 3:
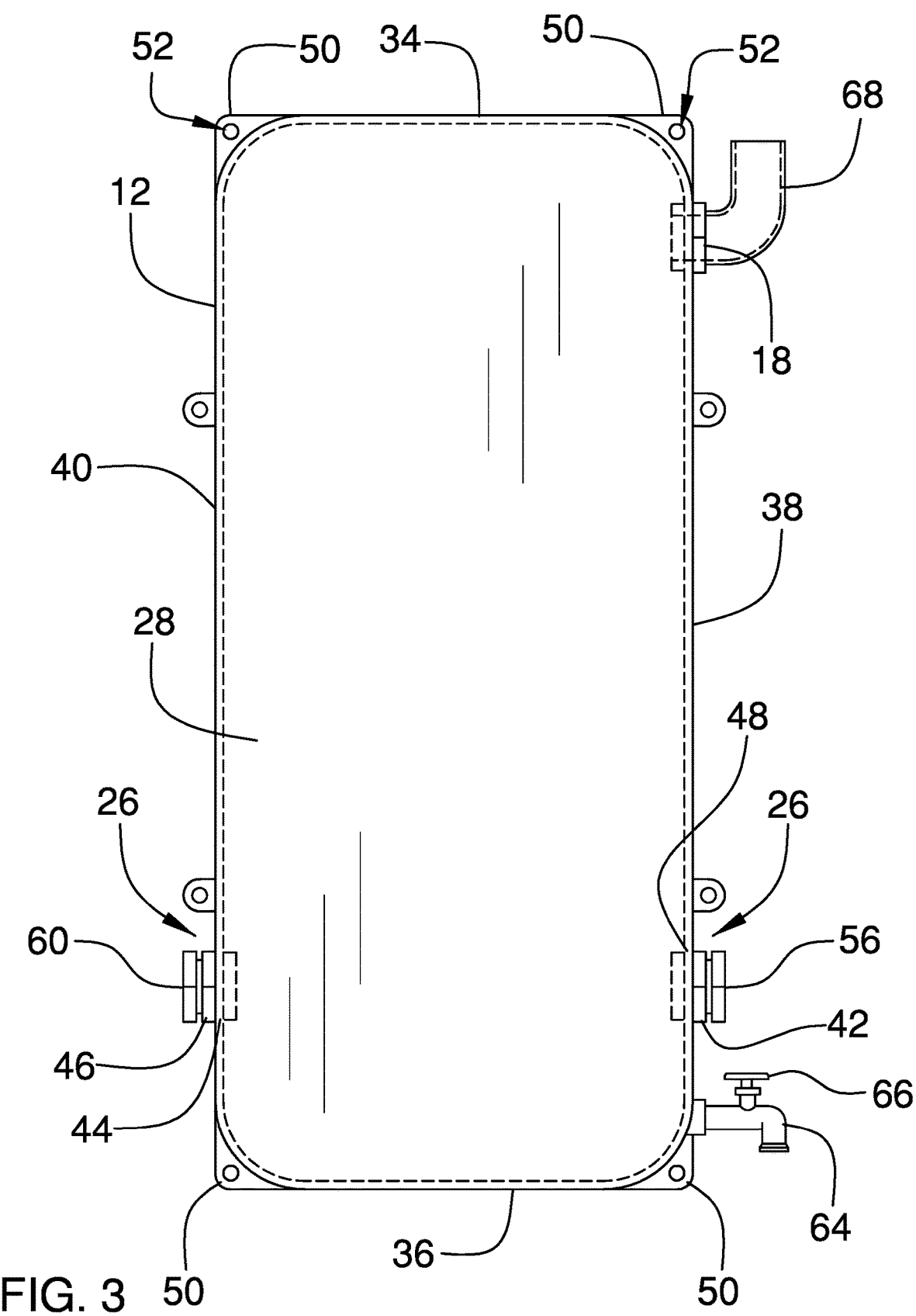
FIG. 3 is a front phantom view of an embodiment of the disclosure.
Figure 4:
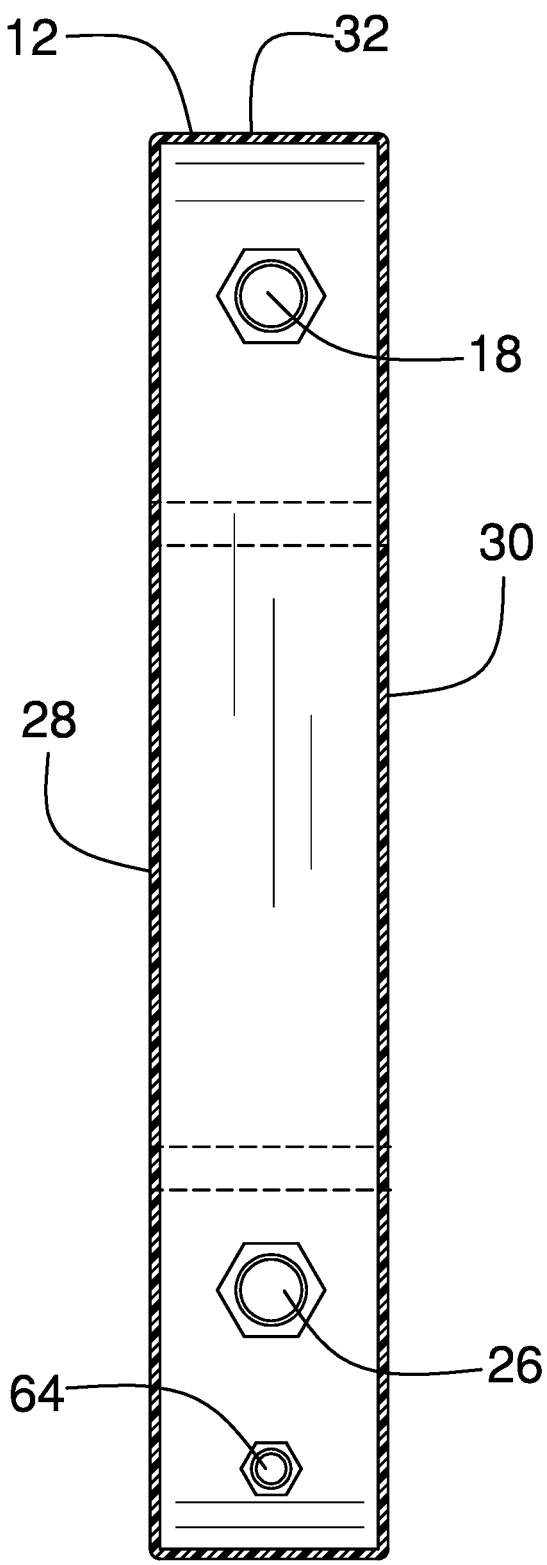
FIG. 4 is a cross sectional view taken alone line 4-4 of FIG. 2 of an embodiment of the disclosure.

With reference now to the drawings, and in particular to FIGS. 1 through 5 thereof, a new collection device embodying the principles and concepts of an embodiment of the disclosure and generally designated by the reference numeral 10 will be described.

As best illustrated in FIGS. 1 through 5, the rainwater collection assembly 10 generally comprises a reservoir 12 that is mountable to an exterior wall 14 of a building 16. In this way the reservoir 12 does not have to be positioned on the ground. The reservoir 12 has an inlet 18 that is in fluid communication with a downspout 20 of a gutter system 22 of the building 16. In this way the inlet 18 can direct rainwater 24 into the reservoir 12 for storage. The reservoir 12 has a pair of outlets 26 each being integrated therein to release the rainwater 24 from the reservoir 12. The reservoir 12 might also be positioned on an interior wall of the building 16. In this way this way a user does not have to go outdoors to access the reservoir 12

The reservoir 12 has a front wall 28, a back wall 30 and an outer wall 32 extending therebetween, and the outer wall 32 has a top side 34, a bottom side 36, a first lateral side 38 and a second lateral side 40. The inlet 18 extends through the outer wall 32, the inlet 18 is positioned on the first lateral side 38 of the outer wall 32 and the inlet 18 is positioned adjacent to the top side 34 of the outer wall 32. The pair of outlets 26 includes a first outlet 42 extending through the outer wall 32. The first outlet 42 is positioned on the first lateral side 38 of the outer wall 32 and the first outlet 42 is positioned adjacent to the bottom side 36. The first outlet 42 has a bounding edge 44 and the bounding edge 44 is threaded.

The pair of outlets 26 includes a second outlet 46 extending through the outer wall 32. The second outlet 46 is positioned on the second lateral side 40 and the second outlet 46 is positioned adjacent to the bottom side 36. The second outlet 46 has a bounding edge 48 and the bounding edge 48 of the second outlet 46 is threaded. A plurality of tabs 50 is provided and each of the tabs 50 is coupled to and extends away from the reservoir 12. Each of the tabs 50 has a fastener aperture 52 extending therethrough to insertably receive a fastener 51 to attach the reservoir 12 to the exterior wall 14 of the building 16. Each of the tabs 50 extends away from the outer wall 32 and each of the tabs 50 is aligned with the front wall 28 of the reservoir 12. Each of the tabs 50 lies on a plane is oriented coplanar with the front wall 28.

A plurality of tubes 54 is each attached to the reservoir 12 to accommodate a fastener 51 for attaching the reservoir 12 to the outer wall 32 of the building 16. Each of the tubes 54 is positioned on the outer wall 32 of the reservoir 12 and each of the tubes 54 is positioned on a respective one of the first lateral side 38 and the second lateral side 40 of the outer wall 32. Each of the tubes 54 extends between the front wall 28 and the back wall 30, and each of the tubes 54 is spaced from a respective one of the top side 34 and the bottom side 36 of the outer wall 32. The fastener 51 may be a screw, a nail or other type of penetrating fastener that can effectively engage the exterior wall 14 of the building 16.

A first plug 56 is attachable to the reservoir 12 for closing the first outlet 42 to inhibit the rainwater 24 from flowing outwardly through the first outlet 42. The first plug 56 has an outer surface 58 and the outer surface 58 is threaded. The outer surface 58 threadably engages the bounding edge 44 of the first outlet 42 for retaining the first plug 56 in the first outlet 42. A second plug 60 is attachable to the reservoir 12 for closing the second outlet 46 to inhibit the rainwater 24 from flowing outwardly through the second outlet 46. The second plug 60 has an outer surface 62 and the outer surface 62 of the second plug 60 is threaded. Additionally, the outer surface 62 of the second plug 60 threadably engages the bounding edge 48 of the second outlet 46 for retaining the second plug 60 in the second outlet 46.

A spigot 64 is provided and the spigot 64 is fluidly integrated into the reservoir 12. The spigot 64 is positionable in an open position to release the rainwater 24 from the reservoir 12. Conversely, the spigot 64 is positionable in a closed position to retain the rainwater 24 in the reservoir 12. The spigot 64 extends through the outer wall 32 of the reservoir 12, the spigot 64 is positioned on the first lateral side 38 of the outer wall 32 and the spigot 64 is positioned between the first outlet 42 and the bottom side 36 of the outer wall 32. The spigot 64 has a knob 66 that is rotatably integrated therein that can be rotated by a user. The knob 66 is in mechanical communication with the spigot 64 for opening and closing the spigot 64.

An intake pipe 68 is fluidly coupled to the inlet 18 in the reservoir 12 and the intake pipe 68 can be placed in fluid communication with the downspout 20 of the gutter system 22 for directing the rainwater 24 into the reservoir 12. The intake pipe 68 has a first end 70, a second end 72 and bend 74 positioned between the first end 70 and the second end 72. The first end 70 is fluidly coupled to the outer wall 32 of the reservoir 12 having the first end 70 being aligned with the inlet 18. The second end 72 is directed upwardly along the first lateral side 38 of the outer wall 32 to engage the downspout 20.

Figure 5:
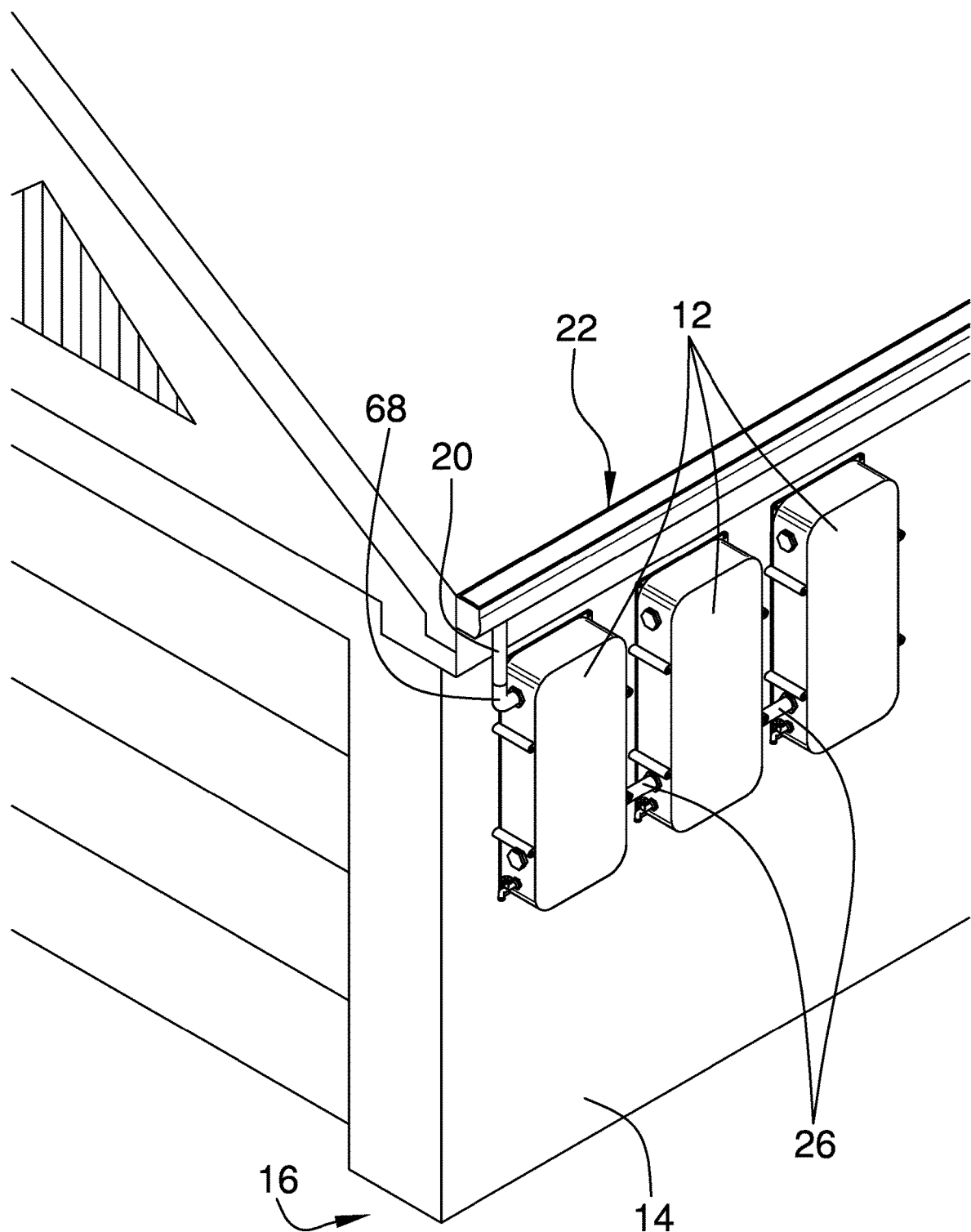
FIG. 5 is a perspective in-use view of an embodiment of the disclosure.

As is most clearly shown in FIG. 5, a plurality of the reservoirs 12 can each be attached to the exterior wall 14 of the building 16. As is also shown in FIG. 5, a plurality of connection pipes 76 is provided each of the connection pipes 76 is fluidly attachable between a respective pair of the plurality of reservoirs 12. In this way the plurality of reservoirs 12 can be daisy chained together to increase the total volume of rainwater 24 that can be stored. Each of the connection pipes 76 is connectable between the second outlet 46 on a respective one of the reservoirs 12 and the first outlet 42 of a respective one of the reservoirs 12.

In use, the reservoir 12 is attached to the exterior wall 14 of the building 16 at a location that facilitates the intake pipe 68 to be fluidly attached to the downspout 20 of the gutter system 22. In this way the rainwater 24 that is captured by the gutter system 22 is directed into the reservoir 12 for storage. The stored rainwater 24 can be released from the reservoir 12 by opening the spigot 64. In this way the rainwater 24 is available for use on demand for a variety of purposes, including but not being limited to, irrigation, cooking and drinking. Two or more of the reservoirs 12 can be daisy chained together for increasing the total volume of rainwater 24 that can be stored. Additionally, the reservoir 12 might be attached to an interior wall of the building 16 and the intake 68 may be routed to penetrate the exterior wall 14 of the building 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rainwater collection assembly being mountable to an exterior wall of a building and being in fluid communication with a gutter system on the building for collecting rainwater, said assembly comprising:

a reservoir being mountable to a wall of a building wherein said reservoir is configured to be inhibited from resting on the ground, said reservoir having an inlet being in fluid communication with a downspout of a gutter system of the building wherein said inlet is configured to direct rainwater into said reservoir for storage, said reservoir having a pair of outlets each being integrated therein wherein said pair of outlets is configured to release the rainwater from said reservoir;

a plurality of tabs, each of said tabs being coupled to and extending away from said reservoir, each of said tabs having a fastener aperture extending therethrough wherein said fastener aperture in each of said tabs is configured to insertably receive a fastener to attach said reservoir to the exterior wall of the building;

a plurality of tubes, each of said tubes being attached to said reservoir wherein each of said tubes is configured to accommodate a fastener for attaching said reservoir to the exterior wall of the building;

a first plug being attachable to said reservoir for closing said first outlet wherein said first plug is configured to inhibit the rainwater from flowing outwardly through said first outlet;

a second plug being attachable to said reservoir for closing said second outlet wherein said second plug is configured to inhibit the rainwater from flowing outwardly through said second outlet;

a spigot being fluidly integrated into said reservoir, said spigot being positionable in an open position wherein said spigot is configured to release the rainwater from said reservoir, said spigot being positionable in a closed position wherein said spigot is configured to retain the rainwater in said reservoir; and an intake pipe being fluidly coupled to said inlet in said reservoir wherein said intake pipe is configured to be in fluid communication with the downspout of the gutter system for directing the rainwater into said reservoir.

2. The assembly according to claim 1, wherein said reservoir has a front wall, a back wall and an outer wall extending therebetween, said outer wall having a top side, a bottom side, a first lateral side and a second lateral side, said inlet extending through said outer wall, said inlet being positioned on said first lateral side of said outer wall, said inlet being positioned adjacent to said top side of said outer wall.

3. The assembly according to claim 2, wherein said pair of outlets includes a first outlet extending through said outer wall, said first outlet being positioned on said first lateral side of said outer wall, said first outlet being positioned adjacent to said bottom side, said first outlet having a bounding edge, said bounding edge being threaded.

4. The assembly according to claim 3, wherein said pair of outlets includes a second outlet extending through said outer wall of said reservoir said second outlet being positioned on said second lateral side, said second outlet being positioned adjacent to said bottom side, said second outlet having a bounding edge, said bounding edge of said second outlet being threaded.

5. The assembly according to claim 4, wherein said second plug has an outer surface, said outer surface of said second plug being threaded, said outer surface of said second plug threadably engaging said bounding edge of said second outlet for retaining said second plug in said second outlet.

6. The assembly according to claim 4, wherein:
a plurality of said reservoirs can each be attached to the exterior wall of the building; and
said assembly includes a plurality of connection pipes, each of said connection pipes being fluidly attachable between a respective pair of said plurality of reservoirs for daisy chaining said plurality of reservoirs together wherein said connection pipes are configured to increase the total volume of rainwater that can be stored, each of said connection pipes being connectable between said second outlet on a respective one of said reservoirs and said first outlet of a respective one of said reservoirs.

7. The assembly according to claim 3, wherein said first plug has an outer surface, said outer surface being threaded, said outer surface threadably engaging said bounding edge of said first outlet for retaining said first plug in said first outlet.

8. The assembly according to claim 3, wherein said spigot extends through said outer wall of said reservoir, said spigot being positioned on said first lateral side of said outer wall, said spigot being positioned between said first outlet and said bottom side of said outer wall, said spigot having a knob being rotatably integrated therein wherein said knob is configured to be rotated by a user, said knob being in mechanical communication with said spigot for opening and closing said spigot.

9. The assembly according to claim 2, wherein each of said tabs extends away from said outer wall, each of said tabs being aligned with said front wall of said reservoir, each of said tabs lying on a plane being oriented coplanar with said front wall.

10. The assembly according to claim 2, wherein each of said tubes is positioned on said outer wall of said reservoir, each of said tubes being positioned on a respective one of said first lateral side and said second lateral side of said outer wall, each of said tubes extending between said front wall and said back wall, each of said tubes being spaced from a respective one of said top side and said bottom side of said outer wall.

11. The assembly according to claim 2, wherein said intake pipe has a first end, a second end and bend positioned between said first end and said second end, said first end being fluidly coupled to said outer wall of said reservoir having said first end being aligned with said inlet, said second end being directed upwardly along said first lateral side of said outer wall wherein said second end is configured to engage the downspout.

12. A rainwater collection assembly being mountable to an exterior wall of a building and being in fluid communication with a gutter system on the building for collecting rainwater, said assembly comprising:

a reservoir being mountable to a wall of a building wherein said reservoir is configured to be inhibited from resting on the ground, said reservoir having an inlet being in fluid communication with a downspout of a gutter system of the building wherein said inlet is configured to direct rainwater into said reservoir for storage, said reservoir having a pair of outlets each being integrated therein wherein said pair of outlets is configured to release the rainwater from said reservoir, said reservoir having a front wall, a back wall and an outer wall extending therebetween, said outer wall having a top side, a bottom side, a first lateral side and a second lateral side, said inlet extending through said outer wall, said inlet being positioned on said first lateral side of said outer wall, said inlet being positioned adjacent to said top side of said outer wall, said pair of outlets including a first outlet extending through said outer wall, said first outlet being positioned on said first lateral side of said outer wall, said first outlet being positioned adjacent to said bottom side, said first outlet having a bounding edge, said bounding edge being threaded, said pair of outlets including a second outlet extending through said outer wall, said second outlet being positioned on said second lateral side, said second outlet being positioned adjacent to said bottom side, said second outlet having a bounding edge, said bounding edge of said second outlet being threaded;

a plurality of tabs, each of said tabs being coupled to and extending away from said reservoir, each of said tabs having a fastener aperture extending therethrough wherein said fastener aperture in each of said tabs is configured to insertably receive a fastener to attach said reservoir to the exterior wall of the building, each of said tabs extending away from said outer wall, each of said tabs being aligned with said front wall of said reservoir, each of said tabs lying on a plane being oriented coplanar with said front wall;

a plurality of tubes, each of said tubes being attached to said reservoir wherein each of said tubes is configured to accommodate a fastener for attaching said reservoir to the outer wall of the building, each of said tubes being positioned on said outer wall of said reservoir, each of said tubes being positioned on a respective one of said first lateral side and said second lateral side of said outer wall, each of said tubes extending between said front wall and said back wall, each of said tubes being spaced from a respective one of said top side and said bottom side of said outer wall;

a first plug being attachable to said reservoir for closing said first outlet wherein said first plug is configured to inhibit the rainwater from flowing outwardly through said first outlet, said first plug having an outer surface, said outer surface being threaded, said outer surface threadably engaging said bounding edge of said first outlet for retaining said first plug in said first outlet;

a second plug being attachable to said reservoir for closing said second outlet wherein said second plug is configured to inhibit the rainwater from flowing outwardly through said second outlet, said second plug having an outer surface, said outer surface of said second plug being threaded, said outer surface of said second plug threadably engaging said bounding edge of said second outlet for retaining said second plug in said second outlet;

a spigot being fluidly integrated into said reservoir, said spigot being positionable in an open position wherein said spigot is configured to release the rainwater from said reservoir, said spigot being positionable in a closed position wherein said spigot is configured to retain the rainwater in said reservoir, said spigot extending through said outer wall of said reservoir, said spigot being positioned on said first lateral side of said outer wall, said spigot being positioned between said first outlet and said bottom side of said outer wall, said spigot having a knob being rotatably integrated therein wherein said knob is configured to be rotated by a user, said knob being in mechanical communication with said spigot for opening and closing said spigot;

an intake pipe being fluidly coupled to said inlet in said reservoir wherein said intake pipe is configured to be in fluid communication with the downspout of the gutter system for directing the rainwater into said reservoir, said intake pipe having a first end, a second end and bend positioned between said first end and said second end, said first end being fluidly coupled to said outer wall of said reservoir having said first end being aligned with said inlet, said second end being directed upwardly along said first lateral side of said outer wall wherein said second end is configured to engage the downspout;

wherein a plurality of said reservoirs can each be attached to the exterior wall of the building; and a plurality of connection pipes, each of said connection pipes being fluidly attachable between a respective pair of said plurality of reservoirs for daisy chaining said plurality of reservoirs together wherein said connection pipes are configured to increase the total volume of rainwater that can be stored, each of said connection pipes being connectable between said second outlet on a respective one of said reservoirs and said first outlet of a respective one of said reservoirs.

* * * * *